United States Patent
Mohrs et al.

(10) Patent No.: US 7,761,716 B2
(45) Date of Patent: Jul. 20, 2010

(54) METHOD AND ARRANGEMENT FOR SECURING A MAN-MACHINE DIALOGUE

(75) Inventors: Walter Mohrs, Bonn (DE); Ulrich Sporn, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 836 days.

(21) Appl. No.: 10/297,226

(22) PCT Filed: May 31, 2001

(86) PCT No.: PCT/DE01/02065

§ 371 (c)(1),
(2), (4) Date: Jun. 21, 2003

(87) PCT Pub. No.: WO01/92995

PCT Pub. Date: Dec. 6, 2001

(65) Prior Publication Data

US 2004/0103294 A1 May 27, 2004

(30) Foreign Application Priority Data

Jun. 2, 2000 (DE) ................................ 100 27 051

(51) Int. Cl.
*G06F 21/00* (2006.01)
(52) U.S. Cl. ........................ 713/186; 713/182; 382/119; 382/124
(58) Field of Classification Search ...................... 726/2, 726/26, 3, 5, 22, 27; 713/150, 182, 151, 713/153, 155, 156, 160, 161, 162, 164, 168
See application file for complete search history.

(56) References Cited

U.S. PATENT DOCUMENTS

| | | | | |
|---|---|---|---|---|
| 5,623,664 A * | 4/1997 | Calvert et al. | ................... | 713/1 |
| 5,664,099 A | 9/1997 | Ozzie et al. | ................. | 395/186 |
| 5,768,539 A * | 6/1998 | Metz et al. | ................... | 709/249 |
| 5,822,435 A | 10/1998 | Boebert et al. | ................. | 380/49 |
| 6,142,910 A * | 11/2000 | Heuvelman | .................... | 482/4 |
| 6,374,079 B1 * | 4/2002 | Hsu | ......................... | 455/11.1 |
| 6,775,398 B1 * | 8/2004 | Schaeck et al. | ............. | 382/124 |
| 6,819,825 B2 * | 11/2004 | Takeuchi et al. | .............. | 385/18 |
| 6,842,550 B2 * | 1/2005 | Takeuchi et al. | .............. | 385/16 |
| 6,904,203 B2 * | 6/2005 | Logvin et al. | ................. | 385/37 |
| 2002/0001856 A1 * | 1/2002 | Chow et al. | .................. | 436/536 |
| 2002/0081059 A1 * | 6/2002 | Takeuchi et al. | .............. | 385/18 |
| 2002/0131611 A1 * | 9/2002 | Hoover et al. | ................ | 381/123 |
| 2002/0176656 A1 * | 11/2002 | Takeuchi et al. | .............. | 385/18 |
| 2003/0190114 A1 * | 10/2003 | Takeuchi et al. | .............. | 385/18 |

FOREIGN PATENT DOCUMENTS

| | | |
|---|---|---|
| EP | 1 290 535 | 11/2003 |
| WO | WO 98/19243 | 5/1998 |

* cited by examiner

*Primary Examiner*—Pramila Parthasarathy
(74) *Attorney, Agent, or Firm*—Baker & Daniels LLP

(57) ABSTRACT

The invention relates to a method and arrangement for securing a man-machine dialogue between a user and at least one application, which may be executed on a terminal, whereby a communication between user and application is achieved by means of input channels and output channels on the terminal. According to the invention, the user can be given the security that he is communicating with only one particular application, whereby the input channels and/or the output channels of the terminal, together or separately, may be optionally switched by means of a switching device such that only the particular application is available.

15 Claims, 1 Drawing Sheet

METHOD AND ARRANGEMENT FOR SECURING A MAN-MACHINE DIALOGUE

BACKGROUND

The invention relates to a process and arrangement for securing a man-machine dialogue according to the generic concept of the independent patent claims.

A man-machine dialogue of this type is performed in digital signature procedures, for example. Digital signatures have an application everywhere that the authenticity and integrity of electronic documents are involved, for example in the areas of electronic commerce, e.g. e-commerce, banking, brokerage, etc. or in the area of public law, e.g. notarial authentication.

In order to perform a digital signature procedure, a suitable end-device is required, e.g. a special terminal or a personal computer, with which a dialogue is possible between a user and at least one application that can be performed on a terminal, whereby a communication between user and application is done via input channels and output channels of the terminal. Also, the modem terminals used in mobile telephone service essentially meet all of the prerequisites for digital signature procedures. They are equipped with alphanumeric display and keypads and implicitly have a chip card reader.

In order to perform a digital signature, the document to be signed is sent via a suitable transmission path, e.g. in mobile telephone service via the mobile telephone network, from a requesting unit, e.g. a server, to a suitable terminal and/or to a signing device in the terminal or on the chip card. The terminal and/or the signing device in the terminal or on the chip card bring the document to be signed onto the display of the terminal so that it is displayed and prompt the user to initiate the signing operation by the keypad. For authentification, the signing device requires the user to enter a signature-PIN on the keypad. After the input of the correct signature-PIN, the signing device carries out the signature and sends it with the document back to the signature-requesting unit. It is also conceivable that the signing device (and/or the terminal) ensures the authenticity of the user by biometric processes, e.g. finger prints, speech input, etc.

Since the signature-dialogue, i.e. the display of the document to be signed, the prompting for confirmation, prompting for input of the signature-PIN is imbedded in a superordinate application-specific dialogue, which comes from and/or is controlled by another source such as a WML-deck, i.e. not the signing device, and since in addition there are several sources for outputting on the display, e.g. other applications running in parallel, user control of the terminal, etc., the user can not be sure whether the display of the document to be signed and the inquiry for the signature-PIN are authentic, i.e. actually come from the signing device.

Basically, the user can not recognize from whom the data shown on the display of the terminal comes. The applications, in particular for WAP (WML-decks), are usually anonymous, i.e. are not checked and certified by the network operator or another authority. Thus, for example, it is possible for foreign applications to put the signature-dialogue after the signing device, in order to get to the user's signature-PIN.

The documents WO 98/19243 A2 and U.S. Pat. No. 5,822, 436 A disclose processes and arrangements for handling security-critical procedures in data processing systems. In addition to the usual elements of a data processing system, such as processor and input/output units, the arrangements described contain special security devices. Thus, it is provided in WO 98/19243 A2 that the security device assumes control over the input and output units during the performance of all security-related procedures. In the patent U.S. Pat. No. 5,822,435 A, the security device is connected between the processor and the input and output units and provides for an encoding of the transmitted data. In the known processes and devices, however, it has not been provided that the input channels and/or output channels are allocated exclusively to one application at a time.

SUMMARY

The purpose of the invention is to provide a process and arrangement for securing a man-machine dialogue that makes it possible for the user to safely identify and control the source of the display information and/or to be able to control the passing on of input information in accordance with specifications.

This purpose is achieved by the characteristics of the independent patent claims.

The invention is based on that fact that the input channels and/or the output channels of the terminal, together or separately, can be switched selectively using a switching device in such a way that they are available exclusively to one specific application.

In this way, it can be ensured according to the invention, that 1) the tasks of a terminal, i.e. the data and text shown on the display
   come from a source that is known to and trusted by the user and/or
   the information source is shown to the user reliably by the terminal and/or
   the user can identify the source himself and 2) the entries on the terminal (e.g. for authentification of the user with regard to a signing device, e.g. using signature-PIN (keypad), finger print (sensor), speech input (speech analysis module)
   are only passed on to a trusted destination that can be specified by the user and/or
   are only passed on to a destination that is reliably shown by the terminal It is also possible by the invention to ensure that a user has a dialogue, e.g. a signature-dialogue, exclusively with one specific application, e.g. a signing device. In other words, the user can be certain that the data shown on the display comes from the signing device and that his entries are passed on exclusively to the signing device.

Advantageous embodiments and additional constructions of the invention are given in the dependent patent claims.

According to the invention it is possible that different applications can each be exclusively coupled alternatively to the input/output channels. In other words, the user can selectively exactly allocate the input/output channels of the terminal exclusively to one application at a time.

The switching over of the input/output channels to an application can be done mechanically, electronically or using software. The switching device contains for this purpose preferably a mechanical, electronic or software-controlled switch.

In a preferred embodiment form, the switching over to a specific application is activated by a defined button on the terminal or an input code. For example, a special button can be allocated to each application that can be selected by the user.

In the case of the use of a button, the switching over is done by the user. The switching can also be initiated automatically, however, by the terminal and by special signals or commands.

In a preferred embodiment of the invention, the switching over to a specific application is shown to the user in an unambiguous manner by an optical and/or acoustic signal. If a choice can be made to switch between several applications, then a separate optical or acoustic signal will be preferably assigned to each application.

The associated application can be started at the same time as the switching over of the input/output channels.

To additionally increase the security for the user, it is provided that the source of the data of the output channel can be identified by a secret code agreed between the source and the user. Each time the data is displayed on the display of the terminal, the secret code is simultaneously displayed for authentification of the source.

The applications that can be executed can be contained in a chip card that can be used in the terminal or in the terminal itself.

BRIEF DESCRIPTION OF THE DRAWINGS

In the following, the invention is explained in greater detail by an embodiment example using a drawing. Additional characteristics, advantages and applications of the invention can be ascertained from the drawing and its description.

DETAILED DESCRIPTION

Figure 1:
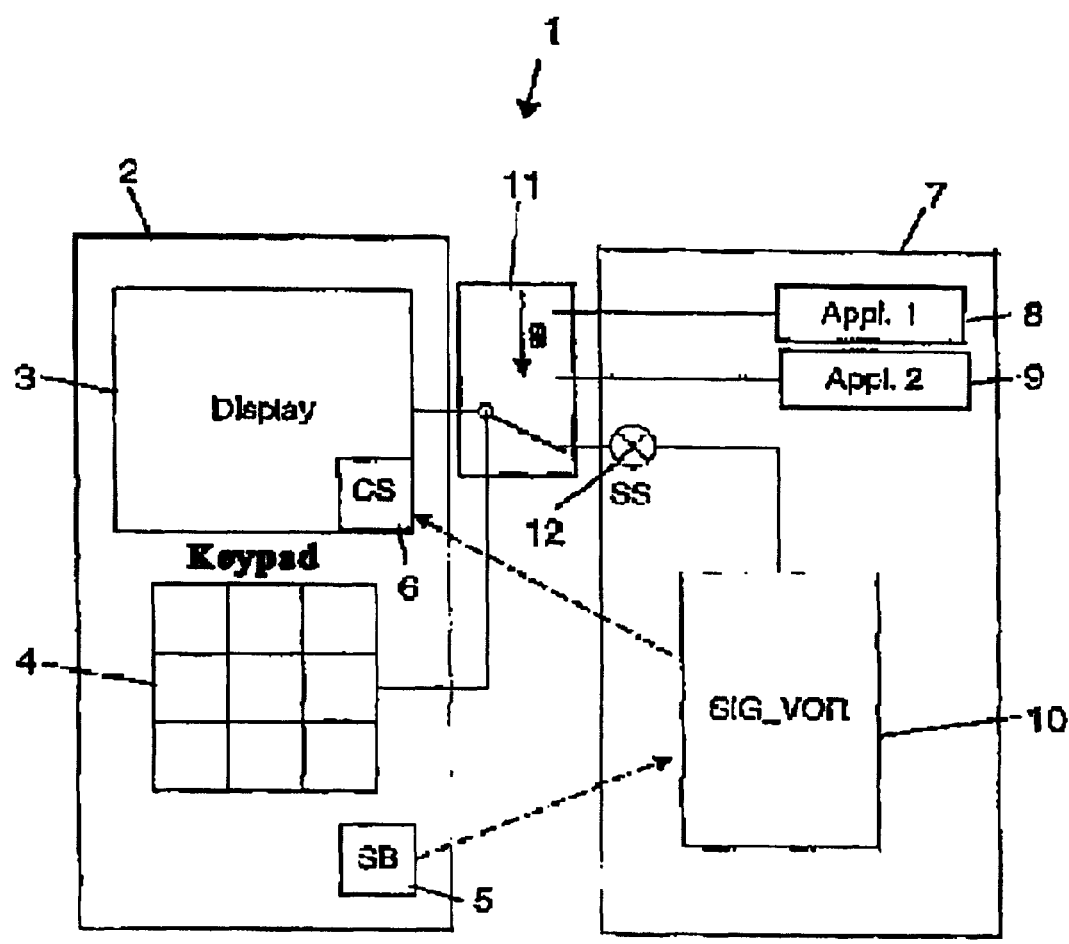

FIG. 1 shows schematically a terminal 1 for performing a digital signature dialogue as one of several available applications. The terminal 1 contains an input and output part 2 with a keypad 4 and a display 3 and a function and application part 7 which contains several applications 8, 9, 10. Furthermore, the terminal I contains a switching device 11, by which a choice can be made to switch the input and output units 3, 4 exclusively to one of the applications 8, 9, 10. The input and output part 2 and the function and application part 7 are usually housed in a common housing (not shown).

In the following, the arrangement and the process are explained by the example of the digital signature, whereby the signing device 10 inside the terminal 1 is both source and destination of the data of the signature dialogue. The signing device 10 can also be contained on a chip card (not shown) to be used with the terminal.

The signature dialogue between the user of the terminal 1 and the signing device 10 can consist of the following steps:

At first, the document to be signed, which is transmitted from a requesting external location, is displayed to the user on the display 3 of the terminal 1 in some manner, either directly as text or as a reference to a text or as an icon and/or image.

Then, the user is prompted to confirm or reject the text.

For this purpose, the user is prompted to authenticate himself to the signing device 10, e.g. by entering a signature PIN by the keypad 4. After that, the signing device 10 checks the input signature PIN, signs the document, if necessary saves the signature and initiates the sending of the signature to the requesting location.

It is possible to record the signature dialogue in the signing device 10 or in the terminal 1, and to save the documents and signatures for possible later verification procedures.

According to the invention, the input/output channels, i.e. the keypad 4 and the display 3 of the terminal 1 of the signing device 10 are made available exclusively in that the directly switched connection (signing switch) is made between input/output channels 3, 4 and the signing device 10, whereby the switch position can be recognized by the user. For this purpose, the terminal contains a switching device 11, which provides that only one application, here the signing device 10, can communicate exclusively with the user via the input/output channels 3, 4 of the terminal 1.

In a preferred embodiment form, the activation of the switch-over into the signing position is achieved by the input of a keypad code, and in the simplest case, by the activation of a special signing button 5 (signature button) on the terminal 1, whereby the activation of the button 5 controls the switching device 11. After the activation of the signature button 5, keypad 4 and display 3 of the terminal 1 are allocated fixed and exclusively to the signing device 10, i.e. each input goes via the keypad 4 to the signing device 10 and each display on the display 3 comes from the signing device IO. This is shown in the drawing by the assignment arrow.

Instead of a manual switch-over, the switch to the signing position can also be initiated automatically by the terminal 1.

For the technical implementation of the switch-over on the terminal 1, different embodiment forms are possible. In the simplest case, the switching device 11 is a switch, which for example, is connected galvanically, electronically, or via software. In each case, the user must be safe in correspondingly implementing the switch-over that is visible to him in the terminal 1.

An additional component of the invention is that the exclusive allocation of the input/output channels, i.e. of the keypad 4 and display 3 to the signing device 10, is shown to the user optically and/or acoustically by a special signature signal 12 used exclusively for this allocation. This signature signal is in the simplest case the switch position of a mechanical throw-over switch. It could also be in a functional way an illumination or a blinking of the signature button or a display element of the display 3.

An additional component of the invention is the possibility for the user to identify the source of the data of the output channel in such a manner that between the source and the user a secret code signal 6 is agreed, which, for example, appears displayed each time on the display 3. An agreed secret code between the user and signing device can, for example, be the sequence of characters 1F7D. During the prompting for the input of the signature-PIN, the following appears on the display:

"Please confirm the signing procedure by entering your signature-PIN. Auth: 1F7D The user recognizes by the authentification code 1F7D that the data comes from the signing device.

DRAWING KEY

1 Terminal
2 Input/output part
3 Display
4 Keypad
5 Signature button
6 Code signal
7 Function/application part
8 First application
9 Second application
10 Signing device (third application)
11 Switching device
12 Signature signal

The invention claimed is:

1. A process for securing a man-machine dialog between a human user and a digital signature device application, comprising: selecting the digital signature device application from a plurality of applications on a terminal which may be executed on the terminal, whereby communication between the human user and the digital signature device application is achieved by means of at least one input channel on the terminal through which the user provides input communication to the terminal and at least one output channel on the terminal through which output communication is provided to the user, wherein the output channel comprises a display;

selectively switching the input channel and/or the output channel of the terminal together or separately such that one or both channels are only available to the digital signature device application exclusively and the input/output channels are allocated exclusively to only said digital signature device application at a time, wherein the digital signature device application is itself present in a chip card that can be used with the terminal or is in the terminal itself;

wherein the digital signature device application comprises the following steps:

a document to be signed is sent from a signature requesting location to the terminal and the document is displayed on the display, the user enters data to verify the authenticity of the user, the digital signature device application checks the authenticity of the verifying data, and the document is signed and then sent back to the requesting location.

2. The process according to claim 1, wherein the plurality of applications can each be alternatively exclusively coupled to the input/output channels.

3. The process according to claim 1, wherein the switching is done mechanically, electronically, or using software.

4. The process according to claim 1, wherein the switching is activated by a defined button on the terminal or an input code.

5. The process according to claim 1, wherein the switching is done manually by the user or automatically by the terminal.

6. The process according to claim 1, wherein the switching to the one selected application is displayed to the user in an unambiguous manner by an optical and/or acoustic signal.

7. The process according to claim 1, wherein the one selected application is started simultaneously with the switching.

8. The method of claim 1, wherein the input channel comprises a keyboard.

9. The method of claim 1, wherein the data entered to authenticate is a PIN.

10. The method of claim 1, wherein the data entered to authenticate is biometric data inputed by the user.

11. A process for securing a man-machine dialog between a human user and one application, comprising: selecting one application from a plurality of applications on a terminal which may be executed on the terminal, whereby communication between the human user and the one selected application is achieved by means of at least one input channel on the terminal through which the user provides input communication to the terminal and at least one output channel on the terminal through which output communication is provided to the user, wherein the output channel comprises a display;

selectively switching the input channel and/or the output channel of the terminal together or separately such that one or both channels are only available to the one selected application exclusively and the input/output channels are allocated exclusively to only said one selected application at a time, wherein the source of data of the output channel is identified by a secret code that has been agreed to between a source and the user and the secret code appears on the display;

wherein the selected application is a digital signature device application comprising the following steps:

a document to be signed is sent from a signature requesting location to the terminal and the document is displayed on the display, the user enters data to verify the authenticity of the user, the digital signature device application checks the authenticity of the verifying data, and the document is signed and then sent back to the requesting location.

12. The process according to claim 11, wherein the secret code appears on a display every time the data of the source is displayed.

13. An arrangement for securing a man-machine dialog, comprising: a terminal with at least one input channel through which a human user provides input communication to the terminal and at lest one output channel comprising a display through which output communication is provided to the user and a plurality of applications on the terminal that can be executed on the terminal and that communicate, for the dialog with the user, by means of the input channel and output channel;

the terminal including a switching device by which the input channel and/or the output channel of the terminal, together or separately, may be selectively switched such that they are only available exclusively to one application selected from the plurality of applications, wherein the input/output channels are allocated exclusively to only the one selected application at a time, and wherein the one selected application is a digital signature device;

wherein the digital signature device includes a program that receives a document to be signed from a signature requesting location, displays the document on the display, receives data entered by the user to verify the authenticity of the user, checks the authenticity of the verifying data, signs the documents and sends the document to the requesting location, wherein the digital signature device is contained in the terminal or a chip card that can be used with the terminal.

14. The arrangement according to claim 13, wherein the switching device comprises a mechanical, electronic, or software-controlled switch.

15. The arrangement according to claim 13, wherein the input channels and output channels are comprised of a keypad and a display of the terminal.

* * * * *